United States Patent
Laude

[11] Patent Number: 6,014,482
[45] Date of Patent: Jan. 11, 2000

[54] SELECTIVE OPTICAL DEVICE AND WAVELENGTH MULTIPLEXER-DEMULTIPLEXER

[75] Inventor: Jean-Pierre Laude, Saclas, France

[73] Assignee: Instruments, S.A., Paris, France

[21] Appl. No.: 09/071,805

[22] Filed: May 4, 1998

[30] Foreign Application Priority Data

May 9, 1997 [FR] France ................................. 97 05737

[51] Int. Cl.[7] ...................................................... G02B 6/26
[52] U.S. Cl. ................................ 385/31; 385/24; 385/37
[58] Field of Search ................................. 385/31, 10, 16, 385/24, 37, 39; 359/114, 130, 124, 115, 118, 119

[56] References Cited

U.S. PATENT DOCUMENTS

| | | | |
|---|---|---|---|
| 4,387,955 | 6/1983 | Ludman et al. | 385/31 |
| 5,412,744 | 5/1995 | Dragone | 385/24 |
| 5,467,418 | 11/1995 | Dragone | 385/37 |
| 5,748,815 | 5/1998 | Hamel et al. | 385/37 |

FOREIGN PATENT DOCUMENTS 0 555 778  8/1983  European Pat. Off. .

97/10525  3/1997  WIPO ..................................... 385/37 X

OTHER PUBLICATIONS

J. B. D. Soole et al: "Use of Multimode Interference Couplers to Broaden the Passband of Wavelength–Dispersive Integrated WDM Filters", IEEE Photonics Technology Letters, vol. 8, No. 10, Oct., 1996, pp. 1340–1342.

Primary Examiner—Phan T. H. Palmer
Attorney, Agent, or Firm—Nikaido Marmelstein Murray & Oram LLP

[57] ABSTRACT

A wavelength selective optical device includes a two-dimensional grating (6) and a device 11. The two-dimensional grating represents an intrinsic function. The device (11) is to change the complex amplitude of the electromagnetic field of the light wave, according to a filtering function, and is to expand the image spot into a monochromatic light in the direction of the spectral dispersion. An optical fiber wavelength multiplexer-demultiplexer includes a filter (11), a mirror (9) and a grating (6). The optical axis of the mirror passes through the plane of the grating and is parallel to the lines of the grating. The filter (11) is arranged in the vicinity of the mirror to control the intrinsic function of the multiplexer-demultiplexer.

25 Claims, 4 Drawing Sheets

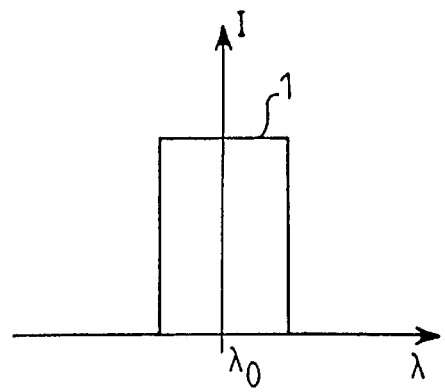
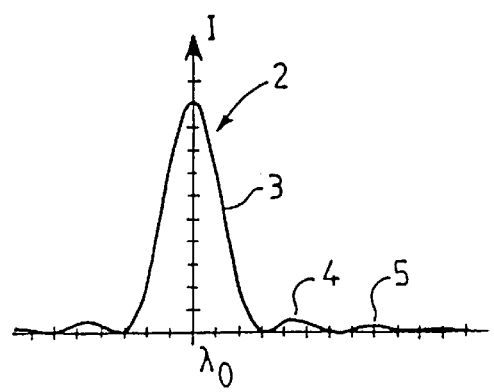
FIG. 1  FIG. 2
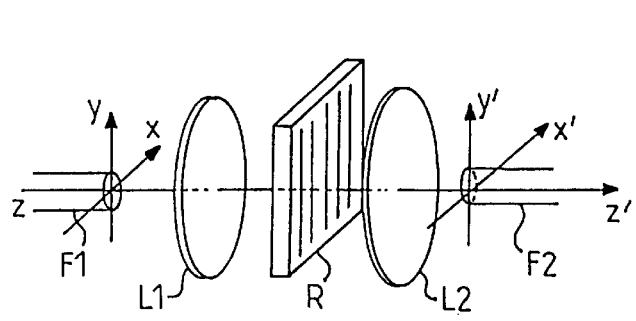
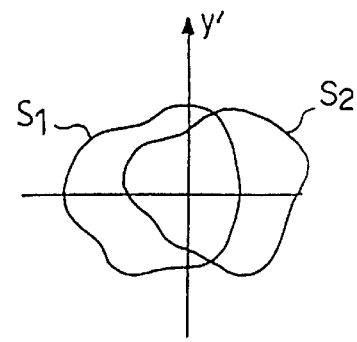
FIG. 8  FIG. 9
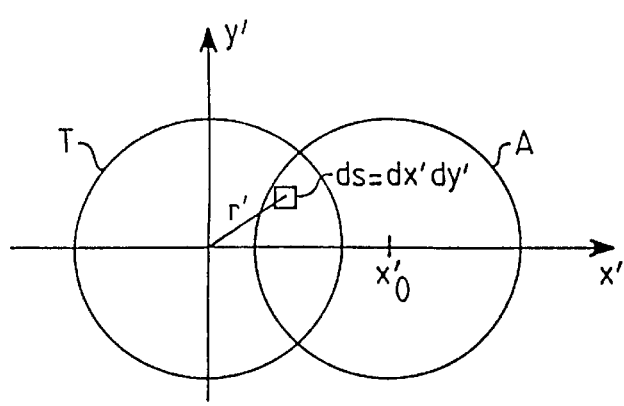
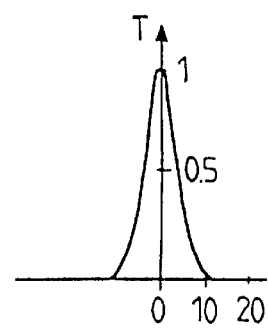
FIG. 10  FIG. 11

SELECTIVE OPTICAL DEVICE AND WAVELENGTH MULTIPLEXER-DEMULTIPLEXER

FIELD OF THE INVENTION

The present invention relates to a wavelength selective optical device comprising a dispersing system. It may be used in wavelength selectors and, more particularly, in optical fiber multiplexers-demultiplexers for optical fiber teletransmission units.

Such multiplexers-demultiplexers are already known and have been described, then gradually perfected, especially in the French patents FR-2.543.768, FR-2.519.148, FR-2.479.981, FR-2.496.260 and in the European patent EP-0. 196.963.

By optical fiber multiplexers-demultiplexers, we mean devices in which input and output luminous waves are propagated by optical fibers.

The invention also relates to optical fiber routers in which a variable number of input fluxes, each with a particular wavelength, propagated by spatially distinct optical fibers, are addressed on a possibly different number of output fibers.

In these different devices, coupling is performed by a dispersing system, generally a network, i.e., a grating for a given wavelength, between an output and an input, generally between an output fiber and an input fiber.

The dispersing system can also be constituted of a set of waveguides delineating optical paths of different lengths, such as integrated optical phase gratings or arrayed waveguide grating. These waveguides may also be optical fibers.

We thus define a channel which, obviously, possesses a certain spectral width $\Delta\lambda$.

By intrinsic function for these various devices and, in particular, for wavelength selective optical devices, we mean their responses in relation to the wavelength in the presence of a wavelength extended input light source whose intensity is supposedly uniform, whatever the wavelength considered.

The intrinsic function representing the intensity I of the light energy transmitted in relation to the wavelength $\lambda$ of an ideal device has the shape of a strobe 1 as represented on FIG. 1, it uniformly transmits a $\Delta\lambda$ wavelength centered on the wavelength $\lambda_0$ and does not transmit any energy at wavelengths outside this bandwidth.

BACKGROUND OF THE INVENTION

In practice, a conventional system has an intrinsic function representing the intensity I of the light energy transmitted in relation to the wavelength $\lambda$ of the shape represented on FIG. 2 whose shape is close to a Gaussian around the wavelength $\lambda_0$ with possibly secondary lobes 4, 5.

The document U.S. Pat. No. 5.412.744 describes a technique for producing a flat pass-band in a wavelength multiplexer. The proposed apparatus comprises two output waveguides coupled to one another.

The document U.S. Pat. No. 5.467.418 describes an apparatus including firstinput and output waveguides separate by a first free zone and second input and output waveguides separate by a second free zone. The first output waveguides and the second input waveguides are linked respectively by waveguides of unequal lengths forming an optical network. The apparatus produces a pass-band which is relatively wide and relative narrow spacing for a given crosstalk level.

SUMMARY OF THE INVENTION

It is the aim of the present invention to improve such an actual device, in order to bring its intrinsic function closer to the ideal intrinsic function defined above.

More particularly, in the case of multiplexers-demultiplexers or of routers, the aim is to enable simultaneous operation of a large number of channels, each of these channels being centred round a wavelength $\lambda_i$ with a spectral width $\Delta\lambda$ as great as possible, while avoiding any crosstalk.

There is a crosstalk when a portion of the energy of a channel is partially mixed to the energy of an adjacent channel. It is well-known that crosstalk disturbs communications and that the devices exhibiting an excessive level of crosstalk are useless in practice.

In this view, the wavelength selective optical device of the invention which comprises a dispersing system, is represented by an intrinsic function and comprises means to change the complex amplitude of the electromagnetic field of the light wave, according to a filtering function, ensuring expansion on the image spot into a monochromatic light in the direction of the spectral dispersion. According to the invention, the dispersing system is a two-dimensional network.

According to various preferred embodiments, each exhibiting its own advantages and liable to be used in conjunction in all their technically possible combinations:

the means to change the complex amplitude of the electromagnetic field consist of a filter arranged in a zone where the light wave is expanded, the device is part of a multiplexer-demultiplexer, the device is part of a wavelength selector, for instance a spectrometer, the filter exhibits more or less elliptical an aperture whose greater size is parallel to the lines of the grating, the filter exhibits more or less hyperbolic an aperture whose greater size is parallel to the lines of the grating, the network is a holographic grating or an engraved-line grating.

The invention also relates to an optical fiber wavelength multiplexer-demultiplexer comprising a filter arranged in a zone where the light wave is expanded, ensuring control of the intrinsic function of the multiplexer-demultiplexer. According to the invention, the multiplexer-demultiplexer comprises a mirror and a grating, whereas the central axis of the mirror is contained in the plane of the grating and parallel to the lines of the latter.

In these various embodiments, the following provisions are particularly advantageous:

the filter is located in the vicinity of the mirror or of the grating, the filter is a spatial filter, the filter comprises two zones and produces relative phase shifting of these zones in relation to one another, phase shifting is in the order of $\pi$, the filter exhibits more or less oblong an aperture in the direction parallel to the grating lines, the filter exhibits more or less rectangular an aperture whose greater size is parallel to the grating lines, the filter exhibits more or less elliptical an aperture whose greater size is parallel to the grating lines, the filter exhibits more or less hyperbolic an aperture whose greater size is parallel to the grating lines.

BRIEF DESCRIPTION OF THE DRAWINGS

The invention will be described below in detail, with reference to the appended drawings in which:

FIG. 1 represents the ideal intrinsic function of a wavelength selective optical device;

FIG. 2 represents the intensity intrinsic function of an actual wavelength selective optical device of the previous art;

FIG. 8 represents schematically a wavelength selective device according to the invention;

FIG. 9 is a representation of the transmission in the output plane of the device of FIG. 8;

FIG. 10 is the transposition of FIG. 9 in the case of single mode fiber;

FIG. 11 is the transmission function in relation to the distance between the center of the output fiber and the center of the image of the input fiber;

DESCRIPTION OF THE PREFERRED EMBODIMENTS

Figure 3:
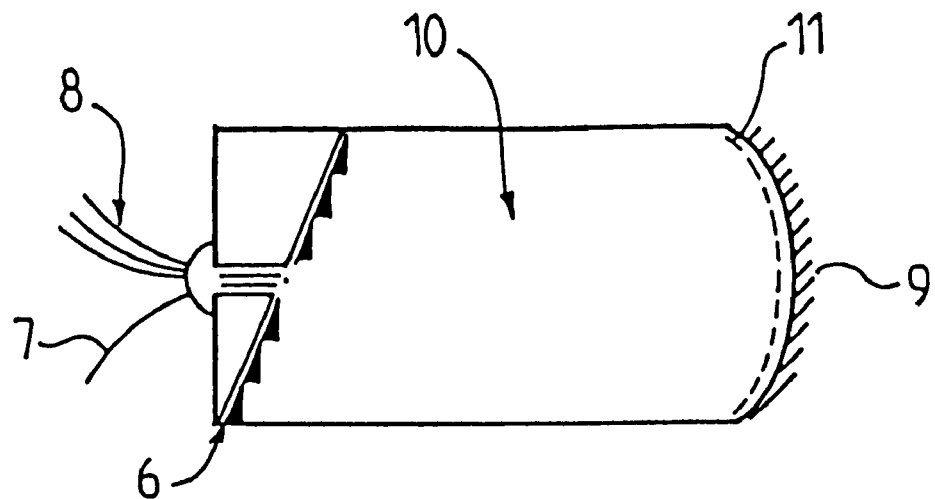
FIG. 3 represents a network demultiplexer implementing the invention.
Figure 4:
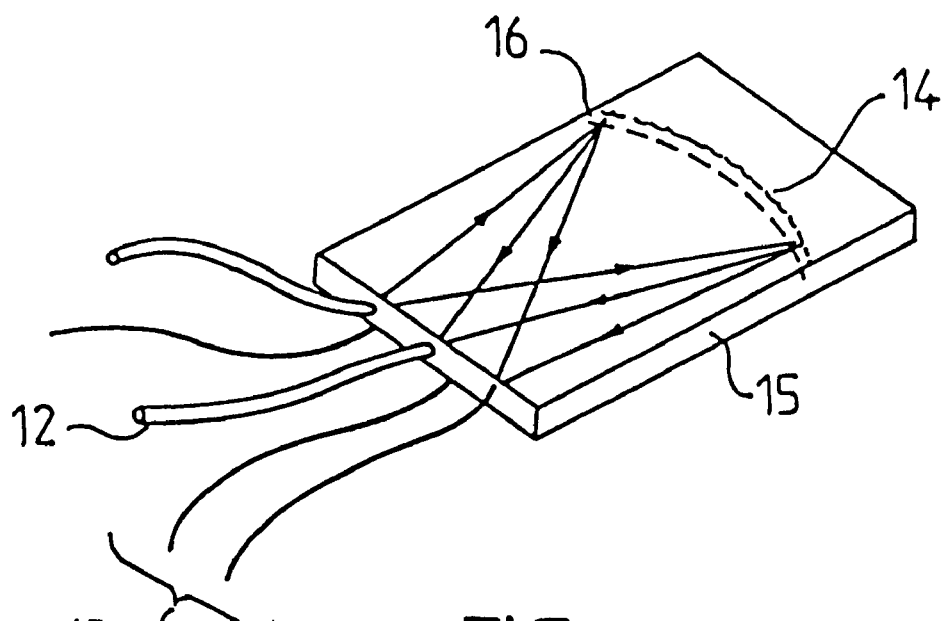
FIG. 4 represents an integrated network multiplexer on a silicium substrate implementing the invention.

The invention relates to a wavelength selective optical device such as represented, for instance, on the FIGS. 3 and 4. We shall first of all refer to FIG. 3 which represents a fiber multiplexer-demultiplexer. It comprises a dispersing system, constituted of a grating 6, an input fiber 7 feeding the device with a multiplexed light flux and an output fiber comb 8 supplying differentiated fluxes for each wavelength. The ends of these fibers 8 are located at the center of the grating 6, itself more or less at the focus of a concave mirror 9. The space 10 situated between the grating 6 and the mirror 9 can receive different optical components enabling according to the needs, to improve the properties of the system. The grating 6 can be holographic or engraved.

It has been observed that means to change the complex amplitude of the electromagnetic field of the light wave enable to cause the expansion of the image spot into a monochromatic light in the direction of the spectral dispersion and hence, to improve the intrinsic function of such a device. These means to change complex amplitude of the electromagnetic field of the light wave advantageously consists of a filter 11 which can be either a spatial filter whose contour exhibits a greater size and a smaller sire, whereby the greater size is parallel to the grating lines 6 or a phase filter exhibiting a center zone which does not affect the light wave and lateral zones injecting $\pi$ phase shifting. The central zone comprises smaller and greater sizes and the greater size is parallel to the grating lines. Advantageously, the smaller size of the central zone is circumscribed inside the central lobe representing the light amplitude in the absence of a filter.

Figure 5:
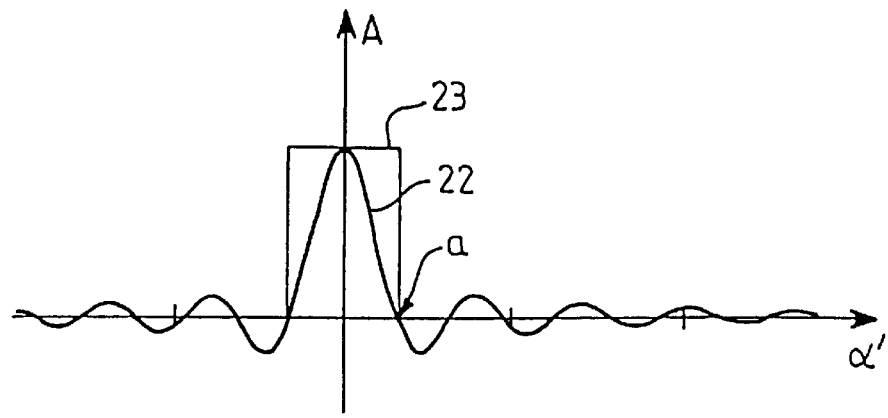
FIG. 5 represents schematically the filtering function of a first type filter in relation to the filtering function with an ideal amplitude.
Figure 6:
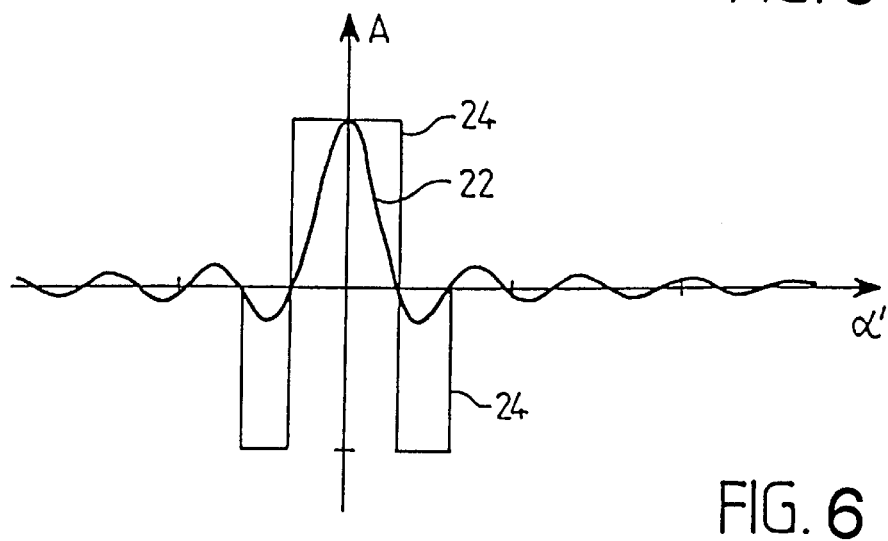
FIG. 6 represents schematically the filtering function of a second type filter in relation to the filtering function with an ideal amplitude.
Figure 7:
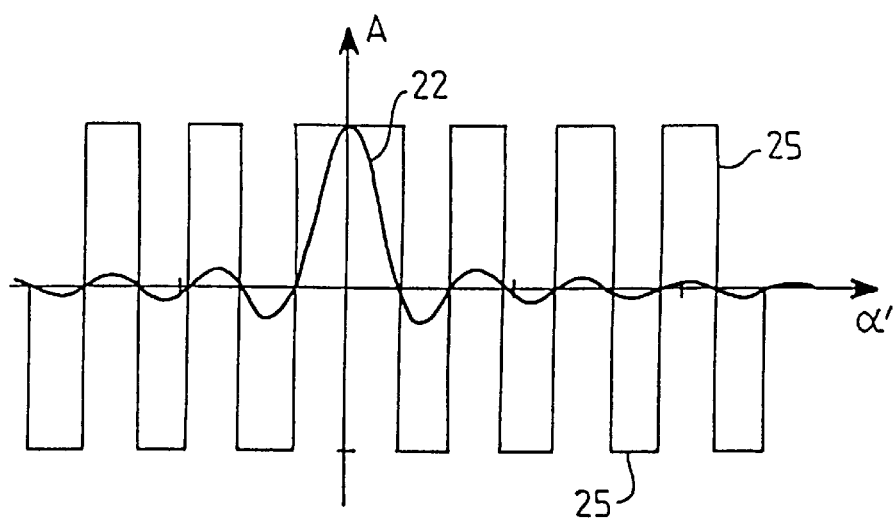
FIG. 7 represents schematically the filtering function of a third type filter in relation to the filtering function with an ideal amplitude.

The result can be even better when using a filter exhibiting a succession of zones injecting, respectively, $\pi$ phase shifting or no phase shifting, and whose geometrical extends correspond to the various lobes of a theoretical filter of ideal complex amplitude, represented by the graph of FIGS. 5, 6 and 7. Generally speaking, there is a spatial filtering function on a reference sphere which can be chosen almost at random between the input and the output of the optical device. In practice, its radius must however be large with respect to the diameter of the fiber core. A good solution consists in choosing this sphere S in a zone where the beam is rather expanded, for instance in the vicinity of one of the input, output or intermediate pupils of the device. In the case of a fiber multiplexer-demultiplexer such as represented on FIG. 3, the beam is expanded, for instance, in the vicinity of the mirror or of the grating.

In practice, with a large-radius sphere S and for typical digital apertures, with fiber output smaller than 0.2, we should be able to perform the spatial filtering function in a plane tangential to the sphere S. On FIG. 13, C represents the center of the image plane, M is the current plane of the image pupil, where the point M is, seen from C, below the angles $\alpha'$ and $\beta'$ which can thus be the co-ordinates of this point in its plane. While referring to notations $\alpha'$ and $\beta'$ of FIG. 13, an ideal filtering function would be of the type $$A(\alpha') = \sin \pi a\alpha'/\pi a\alpha'$$

which is difficult to provide, since a has a constant depending on the geometrical parameters of the optical system. It is therefore possible as stated above to simulate more simply the central lobe of this function $A(\alpha')$ 22 by a rectangle transmission function 23 such that $$f(\alpha') = 1/b \, \text{Rect} \, (\alpha'/b)$$

which is represented on FIG. 6. b is chosen in order to truncate the edges of the Gaussian function $\exp(-\pi^2\omega_0(\alpha'^{2+}\beta'^2))$.

Advantageously, the filtering function is performed, as represented on FIG. 6, on the central lobe and the first lateral lobes on either side of the central lobe by the function 24, while keeping a transmission constant over a fraction of the Gaussian function and while reversing the phase on the edges of the Gaussian function. We can thus obtain phase inversion on the lateral lobes of the function $A(\alpha')$. This result is obtained with phase scale provided by dielectric treatment of optical thickness $ne = \lambda/2$ where n is the layer index and e its thickness.

The filtering, as represented on FIG. 7 by the function 25, can be continued on additional lobes while reversing the phase for each negative value of the transmission function $$(\sin(\pi a\alpha')/\pi a\alpha')^2$$

However, the filtering functions thus provided exhibit steep amplitude or phase variation fronts according to $\alpha'$. Secondary maximum value will correspond to these variations, in the x' and y' planes, which can be disturbing. Their positions is x' depend on the values of the rapid transition positions in $\alpha':\alpha'_1\alpha'_2\alpha'_3 \ldots \alpha'_n$.

This effect will cause small rebounds in the transmission of each channel in relation to the wavelength.

It is however possible to smoothen these transitions by an amplitude or phase progressing transition.

The size according to β' can also be used. The contours of the transitions in the plane α', β' are then variable according to α' et β', which produces a variation of the position in y', i.e. in λ of the rebounds with x' as well.

Analogous results can be obtained in the device made of integrated optics represented on FIG. 4. On this figure, an input fiber 12 and an output fiber comb 13 are coupled to the integrated grating 14 which is carried by a silicium substrate 15. A filter 16 is integrated to produce modifications of the complex amplitude of the electromagnetic field as requested.

The different filters whose characteristics have been specified above, give satisfactory results and improve significantly the conventional selective devices.

The following theoretical analysis provides an explanation of the phenomena involved. It enables to define filters which can be used in relation to the particular properties of the intrinsic function that we seek to obtain for a particular usage.

As regards theoretical analysis, we choose the case of an optical fiber device, as represented on FIG. 8, to calculate the transmission function of the input fiber $F_1$ towards the output fiber $F_2$ or directly towards a receiver $F_2$ or a light reception aperture $F_2$ in the plane x'y'.

The fiber $F_1$ whose extremity is polished and perpendicular to the axis zz', is placed at the focus of an optical system $L_1$. The image provided by the optical system $L_1$, R, $L_2$ where $L_1$ and $L_2$ are lenses, of the extremity of $F_1$ is formed in the focal plane x'y' of $L_2$, after angular dispersion onto the disperser R (usually a classical grating, holographic or a waveguide phase grating, so-called <<arrayed waveguide grating >>)

The extremity of $F_1$ is situated in the plane xy, perpendicular to the axis z. Its image is situated in the image plane x'y', perpendicular to the axis z' (in the case of the waveguides y'=0).

We shall first of calculate the flux $\Phi$ transmitted in $F_2$ in relation to the variation of the wavelength λ of the light delivered by $L_2$.

We shall assume, for simplification purposes, in all the following, that the enlargement of the optical systems is 1 and that the couple $L_1$ and $L_2$ is a-focal.

We have represented on FIG. 9 what happens in the plane x'y'.

The function A(x', y') limited to $S_1$ represents the distribution of amplitude incident at x'y'. The function T(x', y') limited to $S_2$ represents the amplitude transmission function. The amplitude dA induced in $F_2$ for an elementary spectral width dλ is therefore:

$$dA = A(x', y') T(x', y') d\lambda$$

When λ varies, the function A is translated in the plane x'y'.

As dispersion is supposedly linear along x':

$$\lambda - \lambda_0 = k(x' - x'_0)$$

(This is an approximation in which the sine of the diffraction angle is assimilated with the first member of its limited development.)

The flux $\Phi$ is the square module of the correlation of A with T, i.e.:

$$\Phi = |K . \iint A(x'-x'_0, y') T(x', y') dx' dy'|^2$$

For monomode fibers, in the Gaussian approximation, with a mode radius $\omega'_0$ representing the semi-width of the amplitude distribution A at 1/e, we obtain:

$$A = \exp-[r'/\omega'_0]^2$$

For a perfect optical system or a perfect grating with parallel and equidistant lines and in the case when $F_2$ is a monomode fiber identical to the input fiber $F_1$, with the conventions represented on FIG. 10, $\Phi$ can be expressed as follows:

With $r'^2 = x'^2 + y'^2$ $$\Phi = \left| K \int_{-\infty}^{+\infty} \int_{-\infty}^{+\infty} \exp-\left[\frac{x'^2 + y'^2}{\omega_o'^2}\right] \exp-\left[\frac{(x'-x'_o)^2 + y'^2}{\omega_o'^2}\right] dx' dy' \right|^2$$

Hence:

$$\Phi = \left| K \int_{-\infty}^{+\infty} \exp-\left[\frac{2y'^2}{\omega_o'^2}\right] dy' \int_{-\infty}^{+\infty} \exp-\left[\frac{x'^2}{\omega_o'^2}\right] \exp-\left[\frac{(x'-x'_o)^2}{\omega_o'^2}\right] dx' \right|^2$$

Only the second integral depends on $x'_0$. We may consider that it represents an autocorrelation function (⊗ is the correlation sign):

$$\left[\exp-\left(\frac{x'^2}{\omega'^2}\right) \otimes \exp-\left(\frac{(x'-x'_o)^2}{\omega_o'^2}\right)\right]_{(x'_o)} = [g(x') \otimes g(-x'_o)]_{(x'_o)}$$

Still, it can be shown that (see J P Laude - Le multiplexage de longueur d'onde (Wavelength multiplexing) - Masson Ed. Paris 1992);

$$[g(x') \otimes g(-x'_o)] = \sqrt{\Pi} \frac{\omega'_o}{\sqrt{2}} \exp\left(-\frac{x_o'^2}{2\omega_o^2}\right)$$

i.e.:

$$\Phi = k \exp-\left(\frac{x'_o}{\omega'_o}\right)^2$$

Thus, the transmission factor, in relation to the wavelength, is exactly superimposed on the function representing the amplitude distribution A, when we plot both these functions on the same graphic, with for the first abscissa in $(\lambda-\lambda_0)/\alpha$ and for the second abscissa $x'-x'_0$. (The ordinates are suited for the equalisation of the maxima).

The halfway up width of the function F represented on FIG. 11:

$$2\omega'_o \sqrt{\ln 2} = 1,6651 \omega'_o$$

Figure 12:
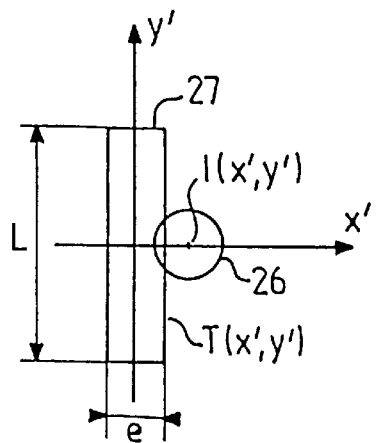
FIG. 12 is a schematic representation of the output slot of a selective device in relation to the image of the input fiber in the output plane.

The case of a fiber 26 monomode at input and of a detector element 27 rectangular at output (for example an element of a diode array) is represented on FIG. 12.

The coupling device is supposedly identical to the previous one (see FIG. 9), but a rectangular detector element is placed at the origin of x'y', whereas its greater length is parallel to the grating lines.

The transmission T(x', y') is supposedly uniform and equal to 1 inside the rectangular element whose sizes are much larger than the core diameter of the fiber which corresponds to an intensity distribution (x', y').

While using this theory, we understand that it is possible to modify the amplitude distribution A by a complex transmfission function, for instance while modifying the phase and the amplitude of the wave surface at the grating R of $L_1$ or of $L_2$ mentioned on FIG. 8.

In the image spot of the input fiber, the distribution III becomes thus a new distribution A' represented by the convolution product of A by the processional response of the system (* is the convolution sign):

$$A' = [A * P]_{(x'_o)}$$

The percussional response if the function P(x'y') representing the complex amplitude in the plane x'y' for an object point situated in x=0, y=0.

We then shall have:

$$F = K|[A * P \otimes A]_{(x'_o)}|^2 \quad \text{in the case of a filter-to-filter coupling}$$

and $$F = K|[A * P]|^2 \otimes T \quad \text{in the case of the output detector element.}$$

Thus, the invention causes a modification of the percussional response by the effect produced on the complex wave surface, i.e. in phase and in amplitude, between the input xy and output x'y' planes. This will preferably take place in a zone where the wave surface is sufficiently expanded. The modification causes, for any useful wavelength, expansion of the image into a monochromatic light of a punctual source in the spectral dispersion direction. We thus obtain a flattening effect, at its apex, of the transmission function $F(x'_0)$ equivalent to the function $F(\lambda)$.

In the cage of the detector element, the intensity dl passing through the slot for an elementary spectral width will be:

$$dI=I(x', y')T(x', y')d\lambda$$

As previously, when $\lambda$ varies, I is translated. A linear translation is approximated in the same conditions. The transmitted flux will be the correlation module of I with T:

$$\Phi = K \cdot \int\int I(x' - x'_o, y')T(x', y')dx'dy'$$

$$\Phi = I \otimes T$$

The intensity distribution in the supposedly perfect image of the extremity of the monomode fiber is thus:

$$A^2 = A_o^2 \exp\left(-\frac{2r^2}{\omega_o'^2}\right)$$

The double integrals can be reduced to simple integrals that can be calculated by the Simpson method. Results are given on p. 57 and 58 of the book mentioned (J P Laude - Le multiplexage de longueur d'onde (Wavelength multiplexing) - Masson Ed. Paris 1992).

Figure 13:
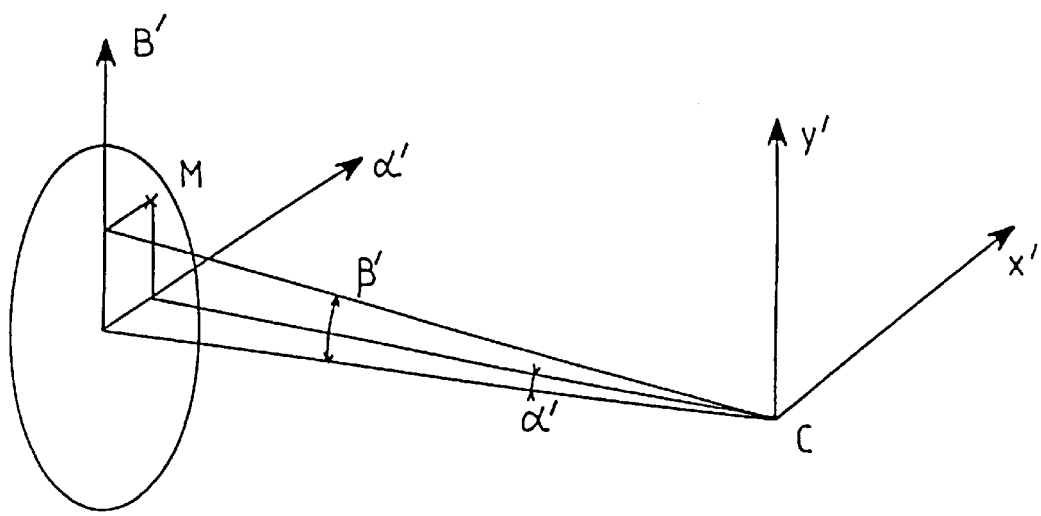
FIG. 13 is a representation underlining the parameters used for the description of the phenomena involved.

The analysis of the phenomena on the basis of the Huygens principle is represented on FIG. 13. We know that the Huygens principle can be expressed in the form of a Fourier transformation (reference for instance A. Marechal and M. Frangcon - Traité- d'optique instrumentale (Treatise on instrumental optics) - Volume 2 Ed. de la revue d'Optique Paris 1960, pages 11/12 and 25/26).

The calculation of the electrical field E(x'y') in the front plane x'y' involves the Fourier transform of the function T representing the distribution of the electrical field on a reference sphere S of radius R centred on C (This sphere can be chosen without any restrictions).

$$E(x'y') = j\frac{R}{\lambda}h(-kR)\int\int F(\alpha'\beta')h[-k(\alpha'x' + \beta'y')]d\alpha'd\beta'$$

(the notation h(x) replaces the function exp (jx) and k=2πλ).

E(x'y') can be assimilated to A(x'y') and we know, further to the Parseval theorem, that the Fourier transform of a convolution product (here symbolised as *) of two functions is the product of the Fourier transformations (TF) of both functions taken individually.

Thus, TF [A*P]=TF [A]*TF[P]

In the case of monomode fibers, we have seen the form of A: $A=A_0 \exp(-(x^2+y_2)/\omega_0^2)$ (x,y or x'y' according whether it is the input plane or the output plane).

The Fourier transform is a Gaussian of the shape:

$$TF[A] = \sqrt{\Pi}\,\omega'_o \exp(-\Pi^2 \omega_o'^2(\alpha'^2 + \beta'^2))$$

Over S, TF[A] is a Gaussianian function.

In the ideal case, we would need a function P such as: P(x')=1/a Rect (x'/a). To this function would correspond a transform such as:

TF[P]=(sin πa α')/πa α'

We can obtain good results in a device represented on FIG. 3 with a centred rectangular slot making up the filter 11 whose sizes are as follows: 12×27 mm.

The other elements exhibit the following characteristics:
monomode filters SMF 28 of the <<Corning >> company (USA)
pitch of the grating 6:600 t/mm
focal of the mirror 9:120 mm
distance from the center of the grating 6 to the apex of the mirror 9:120 mm
relative spacing of the fibers:125 μm We can also obtain good results with a phase shifter filter, phase shifting the π component, with the following central slot sizes:

10 mm×27 mm
and the following lateral slot sizes: 5 mm×27 mm.

The other elements have the values specified above.

What is claimed is:

1. A wavelength selective optical device comprising:
    a dispersing system representing an intrinsic function, and
    means for modifying a complex amplitude of an electromagnetic field of a light wave, according to a filtering function, and for ensuring expansion of an image spot into a monochromatic light in a direction of spectral dispersion,
    wherein said dispersing system is a two-dimensional grating.

2. A device according to claim 1, the means for modifying to change the complex amplitude of the electromagnetic field consist of a filter arranged in an zone where the light wave is expanded.

3. A device according to claim 2, wherein the filter is arranged in a vicinity of one of an input pupil, an output pupil and an intermediate pupil.

4. A device according to claim 2, wherein the filter is arranged in a vicinity of the grating.

5. A device according to claim 2, wherein the filter is arranged on the grating.

6. A device according to claim 1 wherein the grating is an engraved line grating.

7. A device according to claim 1, wherein the device being of a multiplexer-demultiplexer.

8. A device according to claim 1 wherein the device being part of a wavelength selector, for instance a spectrometer.

9. A device according to claim 1 wherein the grating is a a hyperbolic grating.

10. An optical fiber wavelength multiplexer-demultiplexer comprising:

a filter provided in a zone where a light wave is expanded, thus controlling an intrinsic function of said multiplexer-demultiplexer, a mirror, and a grating, wherein an optical axis of the mirror passes through a plane of the grating and is parallel to lines of the grating.

11. A multiplexer-demultiplexer according to claim 10, wherein the filter is a spatial filter.

12. A multiplexer-demultiplexer according to claim 11, wherein the filter comprises two zones and causes relative phase shifting between both these zones.

13. A device according to claim 12, wherein the phase shifting is $\pi$.

14. A device according to claim 11, wherein the filter exhibits more or less a rectangular aperture whose greater size is parallel to the grating lines.

15. A device according to claim 11, wherein the filter exhibits more or less an elliptic aperture whose greater size is parallel to the grating lines.

16. A device according to claim 11, wherein the filter exhibits more or less a hyperbolic aperture whose greater size is parallel to the network lines.

17. A device according to claim 11, wherein the variation of a complex amplitude of one zone to another is gradual.

18. A device according to claim 11, wherein the filter exhibits an oblong aperture in a direction parallel to the grating lines.

19. A device according to claim 10, wherein the filter is arranged in a vicinity of one of an input pupil, an output pupil and an intermediate pupil.

20. A multiplexer-demultiplexer according to claim 10, wherein the filter is provided close to the mirror.

21. A device according to claim 20, wherein the filter is arranged on the grating.

22. A multiplexer-demultiplexer according to claim 10, wherein the filter is provided close to the grating.

23. A device according to claim 22, wherein the filter is arranged on the grating.

24. A wavelength selective optical device comprising:

a dispersing system representing an intrinsic function, and means for modifying a complex amplitude of an electromagnetic field of a light wave, according to a filtering function, and for ensuring expansion of an image spot into a monochromatic light in a direction of spectral dispersion, wherein said dispersing system is a two-dimensional grating, and wherein the means is arranged in a vicinity of one of an input pupil, an output pupil and an intermediate pupil.

25. An optical fiber wavelength multiplexer-demultiplexer comprising:

a filter provided in a zone where a light wave is expanded, thus controlling an intrinsic function of said multiplexer-demultiplexer, a mirror, and a grating, wherein an optical axis of the mirror passes through a plane of the grating and is parallel to lines of the grating, and wherein the filter is arranged in a vicinity of one of an input pupil, an output pupil and an intermediate pupil.

* * * * *